United States Patent
Zhang et al.

(10) Patent No.: US 9,319,989 B2
(45) Date of Patent: Apr. 19, 2016

(54) METHOD AND APPARATUS FOR OPEN LOOP POWER CONTROL

(71) Applicant: HUAWEI TECHNOLOGIES CO., LTD., Shenzhen (CN)

(72) Inventors: Gong Zhang, Shenzhen (CN); Xun Yang, Shenzhen (CN); Hao Yu, Shenzhen (CN); Shunqing Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 667 days.

(21) Appl. No.: 13/716,699

(22) Filed: Dec. 17, 2012

(65) Prior Publication Data

US 2013/0109431 A1 May 2, 2013

Related U.S. Application Data

(63) Continuation of application No. PCT/CN2011/073206, filed on Apr. 23, 2011.

(30) Foreign Application Priority Data

Jun. 17, 2010 (CN) .......................... 2010 1 0201838

(51) Int. Cl.
| | |
|---|---|
| *H04W 52/10* | (2009.01) |
| *H04B 7/02* | (2006.01) |
| *H04W 52/24* | (2009.01) |
| *H04W 52/28* | (2009.01) |

(Continued)

(52) U.S. Cl.
CPC .............. *H04W 52/10* (2013.01); *H04B 7/024* (2013.01); *H04W 52/241* (2013.01); *H04W 52/283* (2013.01); *H04W 52/46* (2013.01); *H04W 52/50* (2013.01)

(58) Field of Classification Search
None
See application file for complete search history.

(56) References Cited

U.S. PATENT DOCUMENTS

| | | | |
|---|---|---|---|
| 2005/0143012 | A1 | 6/2005 | Gu et al. |
| 2007/0149236 | A1 | 6/2007 | Naden et al. |

(Continued)

FOREIGN PATENT DOCUMENTS

| | | |
|---|---|---|
| CN | 101069365 | 11/2007 |
| CN | 101321004 | 12/2008 |
| WO | 2010/005988 | 1/2010 |

OTHER PUBLICATIONS

International Search Report, mailed Jul. 28, 2011, in corresponding International Application No. PCT/CN2011/073206 (5 pp.).

(Continued)

*Primary Examiner* — Philip Sobutka
(74) *Attorney, Agent, or Firm* — Staas & Halsey LLP

(57) ABSTRACT

The method includes: obtaining an initial power allocation ratio of an edge user, and receiving a first SINR sent by the edge user at the initial power allocation ratio; calculating a first power allocation ratio according to the first SINR, selecting a greater power allocation ratio A, and receiving a second SINR sent by the edge user at the power allocation ratio A; determining a third SINR between a first SINR value and a second SINR value; and calculating a second power allocation ratio according to the third SINR, selecting a greater power allocation ratio B, and adjusting power allocation according to the power allocation ratio. Embodiments of the present invention mainly apply to a power control process in the Co-MIMO system.

13 Claims, 4 Drawing Sheets

(51) Int. Cl.
  *H04W 52/46* (2009.01)
  *H04W 52/50* (2009.01)

(56) References Cited

U.S. PATENT DOCUMENTS

| | | | |
|---|---|---|---|
| 2008/0247375 A1* | 10/2008 | Muharemovic ... | H04W 72/0426 455/522 X |
| 2008/0298486 A1 | 12/2008 | Venturino et al. | |
| 2009/0252247 A1 | 10/2009 | Lee et al. | |
| 2011/0177838 A1 | 7/2011 | Olszewski | |

OTHER PUBLICATIONS

Written Opinion of the International Searching Authority, dated Jul. 28, 2011, in corresponding International Application No. PCT/CN2011/073206 (5 pp.).

Office Action, dated Apr. 27, 2013, in corresponding Chinese Application No. 201010201838.9 (13 pp.).

* cited by examiner

METHOD AND APPARATUS FOR OPEN LOOP POWER CONTROL

This application is a continuation of International Application No. PCT/CN2011/073206, filed on Apr. 23, 2011, which claims priority to Chinese Patent Application No. 201010201838.9, filed on Jun. 17, 2010, all of which are hereby incorporated by reference in their entireties.

FIELD OF THE INVENTION

The present invention relates to the field of communications technologies, and in particular, to a method and an apparatus for open loop power control.

BACKGROUND OF THE INVENTION

Co-MIMO (Collaborative-Multiple Input Multiple Output, collaborative-multiple input multiple output) is a key physical layer technology of advanced international mobile communications standards. In a spatial-multiplexing cellular system, the Co-MIMO may coordinate signal transmission of multiple base stations, and the multiple base stations provide communication services for multiple mobile terminals in a manner of collaboration at the same time, thereby reducing interference between cells and improving communication performance.

In a multi-cell collaborative communication scene of the conventional power control scheme, a central control unit calculates a globally optimal power allocation ratio according to global information by adopting a suboptimal iterative algorithm, eliminates the interference between the base stations by joint optimization of collaborative scheduling and power allocation, and improves the performance of a Co-MIMO system. The inventor, however, finds that this technical solution is based on a power control scheme of the central control unit. When performing power allocation, the central control unit needs a lot of centralized calculations, which increases the complexity of the Co-MIMO system.

SUMMARY OF THE INVENTION

Embodiments of the present invention provide a method and an apparatus for open loop power control, which reduces the complexity of a Co-MIMO system.

An open loop power control method, where in a collaborative-multiple input multiple output Co-MIMO system, a base station performs power control independently, and the method includes:

obtaining an initial power allocation ratio of an edge user, and receiving a first SINR sent by the edge user at the initial power allocation ratio;

calculating a first power allocation ratio of the edge user according to the first SINR, determining a greater power allocation ratio A between the initial power allocation ratio and the first power allocation ratio, and receiving a second SINR sent by the edge user at the power allocation ratio A;

determining a target value between a first SINR value and a second SINR value as a third SINR; and calculating a second power allocation ratio of the edge user according to the third SINR, selecting a greater power allocation ratio B from the initial power allocation ratio and the second power allocation ratio, and adjusting signal transmit power according to the power allocation ratio B.

An open loop power control method, which includes:

judging whether a mobile terminal is a cell edge user or a cell center user;

when the mobile terminal is the cell edge user, extracting a wanted signal from received signals, processing the rest of the signals as noise, and sending an SINR to a base station; and when the mobile terminal is the cell center user, demodulating a signal sent by a current base station to an edge user from received signals, subtracting the demodulated signal of the edge user from the received signals, and extracting a wanted signal from the rest of the signals.

A communication apparatus, which includes:

an initial power processing unit, configured to obtain an initial power allocation ratio of an edge user, and receive a first SINR sent by the edge user at the initial power allocation ratio;

a first power adjusting unit, configured to calculate a first power allocation ratio of the edge user according to the first SINR, determine a greater power allocation ratio A between the initial power allocation ratio and the first power allocation ratio, and receive a second SINR sent by the edge user at the power allocation ratio A;

a selecting unit, configured to determine a target value between a first SINR value and a second SINR value as a third SINR; and a second power adjusting unit, configured to calculate a second power allocation ratio of the edge user according to the third SINR, select a greater power allocation ratio B from the initial power allocation ratio and the second power allocation ratio, and adjust signal transmit power according to the power allocation ratio B.

A terminal, which includes:

a judging unit, configured to judge whether a mobile terminal is a cell edge user or a cell center user;

a first decoding unit, configured to, when the mobile terminal is the cell edge user, extract a wanted signal from received signals, process the rest of the signals as noise, and send an SINR to a base station; and a second decoding unit, configured to, when the mobile terminal is the cell center user, demodulate a signal sent by a current base station to an edge user from received signals, subtract the demodulated signal of the edge user from the received signals, and extract a wanted signal from the rest of the signals.

In embodiments of the present invention, in the Co-MIMO system, the base station adjusts the allocation ratio of the signal transmit power with reference to a signal which is of the signal-to-interference ratio and is fed back by the edge user; the implementation of the power control does not require the central control unit to perform a lot of centralized calculations; and compared with the prior art that requires a lot of centralized calculations through the central control unit for performing power control, the system complexity is reduced.

DETAILED DESCRIPTION OF THE EMBODIMENTS

In the embodiments of the present invention, during implementation of power control in a Co-MIMO system, each base station performs power control independently, and dynamically adjusts power allocation of a cell center user side and a cell edge user side according to an SINR signal which is fed back by an edge user. In combination with the accompanying drawings of the embodiments of the present invention, the technical solutions in the embodiments of the present invention are clearly and completely described in the following.

Embodiment 1

Figure 1:
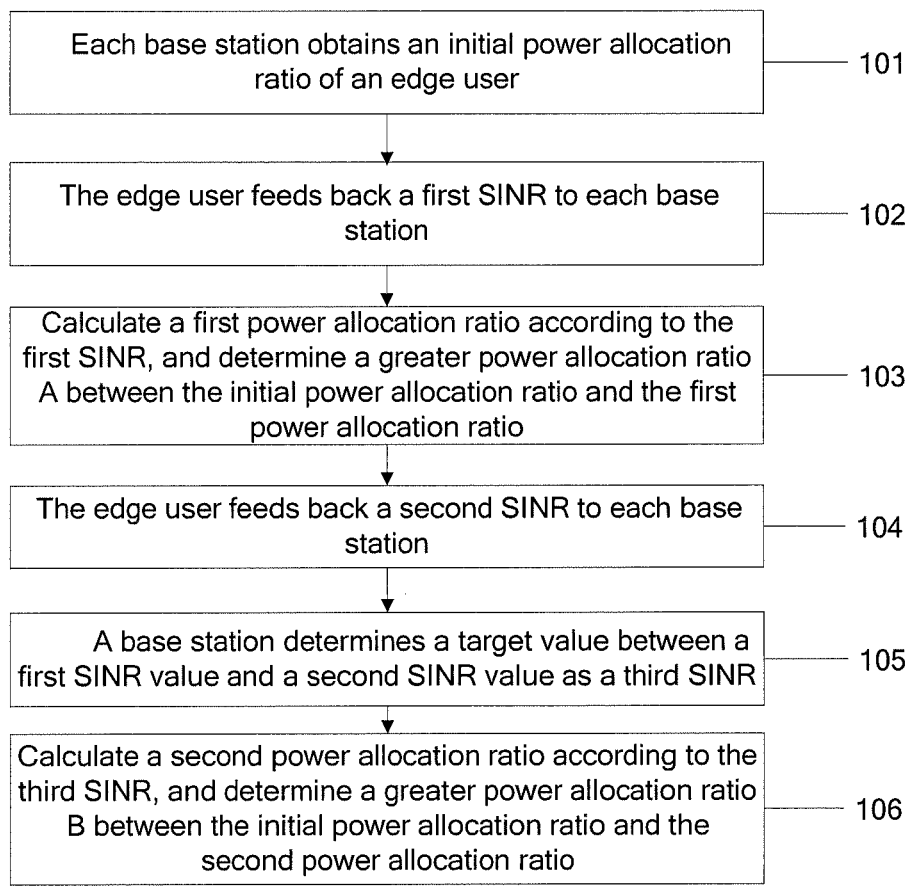
FIG. 1 is a flow chart of an open loop power control method according to Embodiment 1 of the present invention.

An embodiment of the present invention provides an open loop power control method, and in a Co-MIMO system, each base station performs power control independently; as shown in FIG. 1, the method includes the following steps:

101: A base station obtains an initial power allocation ratio of an edge user.

Each base station firstly obtains the initial power allocation ratio of the edge user, and adjusts signal transmit power according to the initial power allocation ratio. Because a sum of the initial power allocation ratio of the edge user and an initial power allocation ratio of a cell center user is 1, the initial power allocation ratio of the cell center user can also be known.

102: At the initial power allocation ratio, the edge user feeds back a first SINR to the base station.

A mobile terminal which is located at an edge of a cell receives signals sent by each base station in the foregoing Co-MIMO system at an initial power allocation ratio of each base station, extracts a wanted signal from the received signals, processes the rest of the signals as noise, and then feeds back the first SINR to each base station.

103: Calculate a first power allocation ratio of the edge user according to the first SINR, and determine a greater power allocation ratio A between the initial power allocation ratio and the first power allocation ratio.

After receiving the first SINR, each base station calculates the first power allocation ratio of the edge user according to the first SINR, selects the greater first power allocation ratio A from the initial power allocation ratio and the first power allocation ratio, and adjusts transmit power according to the selected power allocation ratio A.

104: Receive a second SINR sent by the edge user at the power allocation ratio A.

The edge user sends the second SINR at the power allocation ratio A to the base station.

The mobile terminal at the cell edge receives signals sent by each base station at the selected power allocation ratio A of each base station, and then feeds back the second SINR to each base station.

105: The base station determines a target value between a first SINR value and a second SINR value as a third SINR.

Each base station selects a target value from a range [the first SINR, the second SINR] as the third SINR.

106: Calculate a second power allocation ratio of the edge user according to the third SINR, determine a greater second power allocation ratio B between the initial power allocation ratio and the second power allocation ratio, and adjust power allocation according to the power allocation ratio B.

It can be seen from the foregoing process of implementing power control, in the embodiment of the present invention, each base station performs power control independently, and adjusts the power allocation ratio with reference to a signal which is of a signal-to-interference plus noise ratio and is fed back by the edge user; the power control can be implemented without requiring a central control unit to perform a lot of centralized calculations; and compared with the prior art where the central control unit executes a lot of centralized calculations to perform power control, the system complexity is reduced.

In addition, the central control unit of the conventional Co-MIMO system adopts a closed loop power control method, which requires real-time channel information as necessary conditions for power control, and is easily affected by a system delay during an actual application process. The embodiment of the present invention adopts the open loop power control, which does not require feedback of the real-time channel information to the central control unit; and the power control may be performed by the base station in the system, thereby improving the efficiency of the power control.

Embodiment 2

Figure 2:
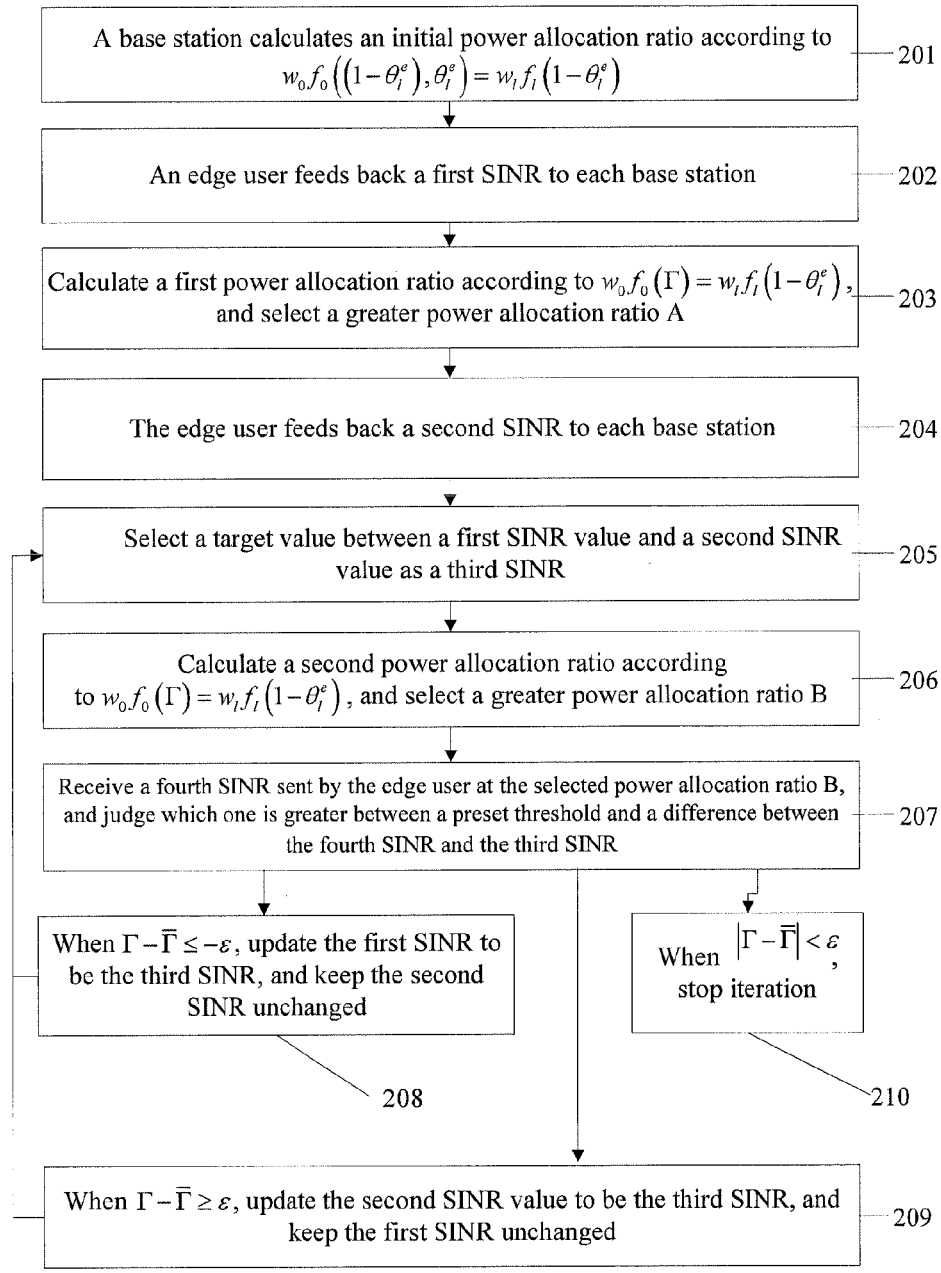
FIG. 2 is a flow chart of an open loop power control method according to Embodiment 2 of the present invention.

During the implementation of the power control in the conventional Co-MIMO system, a central control unit performs a lot of centralized calculations with reference to global information, and obtains a globally optimal power allocation scheme. In order to approach optimal power allocation performance better, an open loop power control method provided in an embodiment of the present invention is adopted, which may further improve system performance. It is assumed that an application scene is an open loop SDMA scene. As shown in FIG. 2, the method includes the following steps:

201: Each base station calculates an initial power allocation ratio of an edge user by using a formula $w_0 f_0((1-\theta_l^e), \theta_l^e) = w_l f_l(1-\theta_l^e)$ according to a principle that a weighted rate of the edge user is equal to a weighted rate of a center user, and adjusts signal transmit power according to the initial power allocation ratio. $w_0$ is a weight of an edge user of an $l^{th}$ base station; $w_l$ is a weight of a center user of the $l^{th}$ base station; and $f_0((1-\theta_l^e), \theta_l^e)$ is a rate of the edge user of the $l^{th}$ base station, $$f_0((1-\theta_l^e), \theta_l^e) = \log\left(1 + \frac{p_l^c \theta_l^e R^e}{1 + p_l^c(1-\theta_l^e)R^c}\right);$$

$f_l(1-\theta_l^e)$ is a rate of the center user of the $l^{th}$ base station, and $f_l(1-\theta_l^e) = \log(1 + p_l^c(1-\theta_l^e)R^c)$; and $\theta_l^e$ is a power allocation ratio of the edge user of the lth base station; $1-\theta_l^e$ is a power allocation ratio of the center user of the lth base station; $p_l^c$ is normalized power from the lth base station to its center user; $R^e$ is an orthogonal space-time block coding OSTBC bit rate of the edge user, and $R^c$ is an OSTBC bit rate of the center user.

202: The cell edge user receives signals sent by each base station in the foregoing Co-MIMO system at an initial power allocation ratio of each base station, extracts a wanted signal from the received signals, processes the rest of the signals as noise, and feeds back a first SINR to each base station.

If a mobile terminal moves to a center of a cell, firstly demodulate a signal sent by a current base station to an edge user from the received signals, subtract the demodulated signal of the edge user from the received signals, and extract the wanted signal from the rest of the signals.

203: After receiving the first SINR, each foregoing base station calculates a first power allocation ratio by using a formula $w_0 f_0(\Gamma) = w_l f_l(1-\theta_l^e)$ according to the principle that the weighted rate of the edge user is equal to the weighted rate of the center user, where $f_0(\Gamma) = \log(1+\Gamma)$, and the value of $\Gamma$ is the first SINR.

In the embodiment of the present invention, the foregoing formula of the weighted rate adopts the OSTBC bit rate, and the foregoing weighted rate formula satisfies $$f_0((1-\theta_l^e), \theta_l^e) = \log\left(1 + \frac{p_l^c \theta_l^e R^e}{1 + p_l^c(1-\theta_l^e)R^c}\right) = f_0(\Gamma) = \log(1+\Gamma).$$

And then, select a greater power allocation ratio A from the initial power allocation ratio and the first power allocation ratio, and adjust transmit power according to the selected power allocation ratio A.

204: The foregoing cell edge user receives signals sent by each base station at the selected power allocation ratio A of each base station, and then feeds back a second SINR to each base station.

205: Each base station selects a target value between a first SINR value and a second SINR value as a third SINR.

For example, take an average value of the foregoing first SINR and second SINR as the third SINR by using a bisection method; and a faster method may also be adopted according to function characteristics, such as a Newton method and a secant method. The objective is to find, between the foregoing first SINR and second SINR, a value which approaches a true solution of a formula $w_0 \log(1+\Gamma(i)) = f_l(\theta_l^e)$.

A value range of the third SINR is a value between the value of the first SINR and the value of the second SINR, which includes the value of the first SINR and the value of the second SINR.

206: Calculate a second power allocation ratio by using the formula $w_0 f_0(\Gamma) = w_l f_l(1-\theta_l^e)$ according to the principle that the weighted rate of the edge user is equal to the weighted rate of the center user, where $f_0(\Gamma) = \log(1+\Gamma)$, the value of $\Gamma$ is the third SINR, and $f_0((1-\theta_l^e), \theta_l^e) = f_0(\Gamma)$.

Select a greater power allocation ratio B from the initial power allocation ratio and the second power allocation ratio, and adjust power allocation according to the power allocation ratio B.

The foregoing method for calculating the power allocation ratio of the edge user adopts the principle that the weighted rate of the edge user is equal to the weighted rate of the center user, thereby balancing quality of a wanted signal received by the edge user and quality of a wanted signal received by the center user, and reducing a situation in the prior art that the quality of the signal received by the user at the cell edge is poorer than quality of the wanted signal received by the center user. In addition, optionally, a weighted SINR may also be adopted for the calculation of the power allocation ratio.

207: Receive a fourth SINR sent by the edge user at the selected power allocation ratio B, and judge which one is greater between a preset threshold and a difference between the fourth SINR and the third SINR. It is assumed that: $\Gamma$ denotes the fourth SINR, $\overline{\Gamma}$ denotes the third SINR, and $\epsilon$ denotes the preset threshold. Different processing is performed according to different judging results.

208: When $\Gamma - \overline{\Gamma} \leq -\epsilon$, update the value of the first SINR to be the third SINR, and keep the second SINR unchanged; turn to continue to execute step 205, and start an iterative calculation.

209: When $|\Gamma - \overline{\Gamma}| \geq \epsilon$, update the value of the second SINR to be the third SINR, and keep the first SINR unchanged; turn to continue to execute step 205, and start an iterative calculation.

210: When $|\Gamma - \overline{\Gamma}| < \epsilon$, stop the foregoing iterative calculation.

Each iteration at the same SINR makes the system performance approach optimal performance. By adopting the open loop power control method provided in the embodiment of the present invention, a simulation experiment is performed in the following scene: In this simulation scene, a base station has 4 antennas and a user has 2 antennas; distances d from the cell edge user to the base station are 3.4, 3.6, and 3.8; distances d from the cell center user to the base station are 1, 0.8, and 0.6; a path loss model is PL(dB)=130.19+37.6 $\log_{10}$(d (km)), and a shadow fading variance is 8 dB.

In a simulation result, by adopting the embodiment of the present invention, at the same SINR, system capacity performance is obtained after four iterations are performed, which may quickly approach optimal power allocation performance when the central control unit exists.

Compared with the prior art, in the embodiment of the present invention, each base station performs the power control independently with reference to a signal which is of a signal-to-interference ratio plus noise and is fed back by the edge user; and the central control unit is not required to perform a lot of centralized calculations, thereby reducing the system complexity, enhancing the flexibility, and approaching the optimal performance through a very small quantity of iterations.

Embodiment 3

Figure 3:
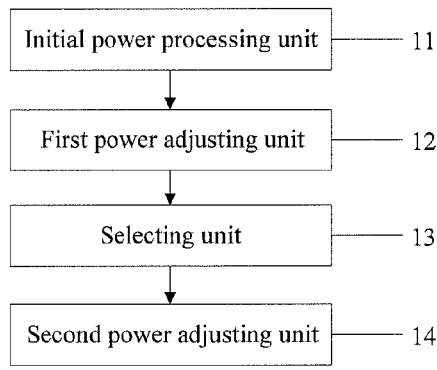
FIG. 3 is a first structural diagram of a communication apparatus according to Embodiment 3 of the present invention.

An embodiment of the present invention provides a communication apparatus, and this apparatus may implement the foregoing method and may be a base station; as shown in FIG. 3, it includes an initial power processing unit 11, a first power adjusting unit 12, a selecting unit 13, and a second power adjusting unit 14.

The initial power processing unit 11 is configured to obtain an initial power allocation ratio of an edge user, and receive a first SINR sent by the edge user at the initial power allocation ratio. For example, in an open loop SDMA scene, calculate an initial power allocation ratio of the edge user by using a formula $w_0 f_0((1-\theta_l^e), \theta_l^e) = w_l f_l(1-\theta_l^e)$ according to a principle that a weighted rate of an edge user is equal to a weighted rate of a center user, and adjust signal transmit power according to the initial power allocation ratio. $w_0$ is a weight of an edge user of an $l^{th}$ base station; $w_l$ is a weight of a center user of the $l^{th}$ base station; and $f_0((1-\theta_l^e), \theta_l^e)$ is a rate of the edge user of the $l^{th}$ base station;

$$f_0((1-\theta_l^e), \theta_l^e) = \log\left(1 + \frac{p_l^c \theta_l^e R^e}{1 + p_l^c(1-\theta_l^e)R^c}\right);$$

$f_l(1-\theta_l^e)$ is a rate of the center user of the $l^{th}$ base station, and $f_l(1-\theta_l^e) = \log(1 + p_l^c(1-\theta_l^e)R^c)$; and $\theta_l^e$ is a power allocation ratio of the edge user of the lth base station; $1-\theta_l^e$ is a power allocation ratio of the center user of the lth base station; $p_l^c$ is normalized power from the lth base station to its center user; $R^e$ is an orthogonal space-time block coding OSTBC bit rate of the edge user, and $R^c$ is an OSTBC bit rate of the center user.

The first power adjusting unit 12 is configured to calculate a first power allocation ratio of the edge user according to the first SINR, determine a greater power allocation ratio A between the initial power allocation ratio and the first power allocation ratio, and receive a second SINR sent by the edge user at the power allocation ratio A. For example, calculate a first power allocation ratio by using a formula $w_0 f_0(\Gamma) = w_I f_I (1-\theta_I^e)$ according to the principle that the weighted rate of the edge user is equal to the weighted rate of the center user, where $f_0(\Gamma) = \log(1+\Gamma)$, and a value of $\Gamma$ is the first SINR; and calculate the first power allocation ratio of the edge user.

The selecting unit 13 is configured to determine a target value between a first SINR value and a second SINR value as a third SINR.

The second power adjusting unit 14 is configured to calculate a second power allocation ratio of the edge user according to the third SINR, select a greater power allocation ratio B from the initial power allocation ratio and the second power allocation ratio, and adjust power allocation according to the power allocation ratio B. For example, when the second power adjusting unit 14 calculates the second power allocation ratio of the edge user according to the third SINR, the second power allocation ratio may be calculated by using the formula $w_0 f_0(\Gamma) = w_I f_I(1-\theta_I^e)$ according to the principle that the weighted rate of the edge user is equal to the weighted rate of the center user, where $f_0(\Gamma) = \log(1+\Gamma)$, the value of $\Gamma$ is the third SINR, and $f_0((1-\theta_I^e), \theta_I^e) = f_0(\Gamma)$.

Figure 4:
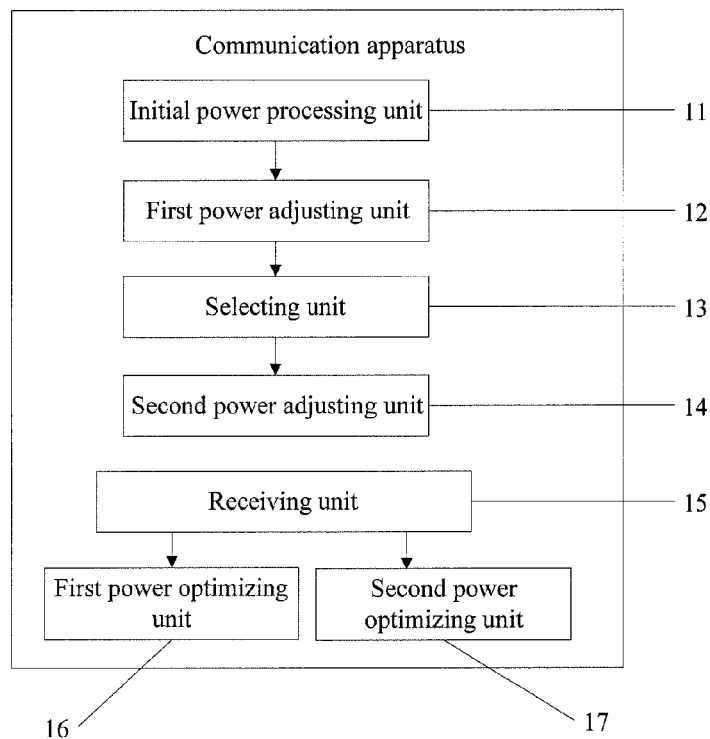
FIG. 4 is a second structural diagram of a communication apparatus according to Embodiment 3 of the present invention.

Further, in order to improve system performance, as shown in FIG. 4, the communication apparatus further includes: a receiving unit 15, a first power optimizing unit 16, and a second power optimizing unit 17.

The receiving unit 15 is configured to receive a fourth SINR sent by the edge user at the power allocation ratio B.

The first power optimizing unit 16 is configured to, when a difference obtained by subtracting a preset threshold from the fourth SINR is not less than the third SINR, update the value of the first SINR to be the third SINR, and keep the second SINR unchanged; and then, the selecting unit selects a target value between the updated value of the first SINR and the updated value of the second SINR as the third SINR; and an iterative calculation begins.

The second power optimizing unit 17 is configured to, when a sum obtained by adding the preset threshold to the fourth SINR is not greater than the third SINR, update the value of the second SINR to be the third SINR, and keep the first SINR unchanged; and then, the selecting unit selects a target value between the updated value of the first SINR and the updated value of the second SINR as the third SINR; and the iterative calculation begins.

When an absolute value of a difference between the fourth SINR and the third SINR is smaller than the preset threshold, the communication apparatus stops the foregoing iterative calculation.

In a Co-MIMO system, the base station provided in the embodiment of the present invention may adjust the signal transmit power according to a signal which is of a signal-to-interference plus noise ratio and is fed back by the edge user; and in a process that the base station implements the power control, a central control unit is not required to perform a lot of calculations, and the complexity of the Co-MIMO system is reduced.

Figure 5:
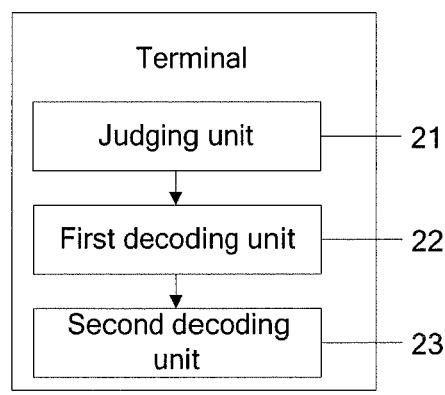
FIG. 5 is a structural diagram of a terminal according to Embodiment 3 of the present invention.

The embodiment of the present invention further provides a terminal, as shown in FIG. 5, including: a judging unit 21, a first decoding unit 22, and a second decoding unit 23.

The judging unit 21 is configured to judge whether a mobile terminal is a cell edge user or a cell center user.

The first decoding unit 22 is configured to, when the mobile terminal is the cell edge user, extract a wanted signal from received signals, process the rest of the signals as noise, and send an SINR to all base stations.

After the terminal receives the signals sent by each base station of the Co-MIMO system, the terminal feeds back an SINR at a current power allocation ratio to each base station, and provides a reference of power adjustment for each base station.

The second decoding unit 23 is configured to, when the mobile terminal is the cell center user, demodulate a signal sent by a current base station to the edge user from the received signals, subtract the demodulated signal of the edge user from the received signals, and extract the wanted signal from the rest of the signals.

In the prior art, when the terminal moves to the cell edge and the cell center, a same decoding mode is adopted. When a sent signal is based on an OSTBC structure, a signal received by the user at the cell center are severely interfered by a signal sent to the edge user; the terminal provided in the embodiment of the present invention is set with the second decoding unit, and when the user is located at the cell center, the second decoding unit may be adopted to firstly remove a signal sent by the base station to the edge user, and then extract the wanted signal, which can improve the quality of the wanted signal received by the user which is located at the cell center.

In an actual application process, the foregoing communication apparatus may be the base station, and in the Co-MIMO system, each base station performs the power control independently, and adjusts the power allocation ratio with reference to the signal which is of the signal-to-interference plus noise ratio and is fed back by a terminal which is located at the edge; the implementation of the power control does not require the central control unit to perform a lot of centralized calculations, and compared with the prior art where the central control unit is required to perform a lot of centralized calculations for performing power control, the system complexity is reduced.

The embodiments of the present invention are mainly applied to the field of the communications technologies, and particularly, in the power control process in the Co-MIMO system, the system complexity is reduced.

What is claimed is:

1. An open loop power control method, wherein in a collaborative-multiple input multiple output Co-MIMO system, a base station performs power control, and the method comprises:

obtaining an initial power allocation ratio of an edge user, and receiving a first signal to interference plus noise ratio (SINR) sent by the edge user at the initial power allocation ratio;

calculating a first power allocation ratio of the edge user according to the first SINR, determining a greater power allocation ratio A between the initial power allocation ratio and the first power allocation ratio, and receiving a second SINR sent by the edge user at the power allocation ratio A;

determining a target value between the first SINR value and the second SINR value as a third SINR; and calculating a second power allocation ratio of the edge user according to the third SINR, determining a greater power allocation ratio B between the initial power allocation ratio and the second power allocation ratio, and adjusting signal transmit power according to the power allocation ratio B.

2. The open loop power control method according to claim 1, further comprising:

receiving a fourth SINR sent by the edge user at the selected power allocation ratio B;

if a difference obtained by subtracting a preset threshold from the fourth SINR is not less than the third SINR, updating the value of the first SINR to be the value of the third SINR and keeping the second SINR unchanged, and then selecting a target value between the value of the first SINR and the value of the second SINR as a third SINR;

if a sum obtained by adding the preset threshold to the fourth SINR is not greater than the third SINR, updating the value of the second SINR to be the value of the third SINR and keeping the first SINR unchanged, and then selecting a target value between the value of the first SINR and the value of the second SINR as a third SINR; and if an absolute value of a difference between the fourth SINR and the third SINR is not smaller than the preset threshold, performing an iterative calculation, and if the absolute value of the difference is smaller than the preset threshold, stopping the iterative calculation.

3. The open loop power control method according to claim 1, wherein the obtaining the initial power allocation ratio of the edge user is: obtaining the initial power allocation ratio of the edge user according to equality between a weighted rate of the edge user and a weighted rate of a center user;

the calculating the first power allocation ratio of the edge user according to the first SINR comprises:

calculating the first power allocation ratio of the edge user according to the first SINR and based on the equality between the weighted rate of the edge user and the weighted rate of the center user; and the calculating the second power allocation ratio of the edge user according to the third SINR comprises: calculating the second power allocation ratio of the edge user according to the third SINR and based on the equality between the weighted rate of the edge user and the weighted rate of the center user.

4. The open loop power control method according to claim 3, wherein the obtaining the initial power allocation ratio of the edge user according to the equality between the weighted rate of the edge user and the weighted rate of the center user is: calculating the initial power allocation ratio of the edge user according to $w_0 f_0((1-\theta_l^e))=w_l f_l(1-\theta_l^e)$, wherein $w_0$ is a weight of an edge user of an $l^{th}$ base station, $w_l$ is a weight of a center user of the $l^{th}$ to base station, $f_0((1-\theta_l^e),\theta_l^e)$ is a rate of the edge user of the $l^{th}$ base station, $$f_0((1-\theta_l^e), \theta_l^e) = \log\left(1 + \frac{p_l^c \theta_l^e R^e}{1 + p_l^c(1-\theta_l^e)R^c}\right),$$

$f_l(1-\theta_l^e)$ is a rate of the center user of the $l^{th}$ base station, $f_l(1-\theta_l^e)=\log(1+p_l^c(1-\theta_l^e)R^c)$, and $\theta_l^e$ is a power allocation ratio of the edge user of the $l^{th}$ base station, $1-\theta_l^e$ is a power allocation ratio of the center user of the $l^{th}$ base station, $p_l^c$ is normalized power from the $l^{th}$ base station to its center user, $R^e$ is an orthogonal space-time block coding OSTBC bit rate of the edge user, and $R^c$ is an OSTBC bit rate of the center user.

5. The open loop power control method according to claim 3, wherein the calculating the first power allocation ratio of the edge user according to the first SINR and based on the equality between the weighted rate of the edge user and the weighted rate of the center user is: calculating the first power allocation ratio according to $w_0 f_0(\Gamma)=w_l f_l(1-\theta_l^e)$, wherein $f_0(\Gamma)=\log(1+\Gamma)$, a value of $\Gamma$ is the first SINR, and $f_0((1-\theta_l^e), \theta_l^e)=f_0(\Gamma)$; and the calculating the second power allocation ratio of the edge user according to the third SINR and based on the equality between the weighted rate of the edge user and the weighted rate of the center user is: calculating the second power allocation ratio according to $w_0 f_0(\Gamma)=w_l f_l(1-\theta_l^e)$, wherein $f_0(\Gamma)=\log(1+\Gamma)$, the value of $\Gamma$ is the third SINR, and $f_0((1-\theta_l^e))=f_0(\Gamma)$.

6. The open loop power control method according to claim 1, wherein the method of determining a target value between the value of the first SINR and the value of the second SINR as the third SINR comprises: a bisection method, a Newton method, or a secant method.

7. An open loop power control method according to claim 1, further comprising:

judging whether a mobile terminal is a cell edge user or a cell center user;

if the mobile terminal is the cell edge user, extracting a wanted signal from received signals, processing the rest of the signals as noise, and sending an SINR to a base station; and if the mobile terminal is the cell center user, demodulating a signal sent by a current base station to an edge user from received signals, subtracting the demodulated signal of the edge user from the received signals, and extracting a wanted signal from the rest of the signals.

8. A communication apparatus, comprising:

an initial power processing unit, configured to obtain an initial power allocation ratio of an edge user, and receive a first SINR sent by the edge user at the initial power allocation ratio;

a first power adjusting unit, configured to calculate a first power allocation ratio of the edge user according to the first SINR, determine a greater power allocation ratio A between the initial power allocation ratio and the first power allocation ratio, and receive a second SINR sent by the edge user at the power allocation ratio A;

a selecting unit, configured to determine a target value between the first SINR value and the second SINR value as a third SINR; and a second power adjusting unit, configured to calculate a second power allocation ratio of the edge user according to the third SINR, determine a greater power allocation ratio B between the initial power allocation ratio and the second power allocation ratio, and adjust signal transmit power according to the power allocation ratio B.

9. The communication apparatus according to claim 8, further comprising:

a receiving unit, configured to receive a fourth SINR sent by the edge user at the power allocation ratio B;

a first power optimizing unit, configured to, if a difference obtained by subtracting a preset threshold from the fourth SINR is not less than the third SINR, update the value of the first SINR to be the value of the third SINR and keep the second SINR unchanged, and then the selecting unit selects a target value between the value of the first SINR and the value of the second SINR as a third SINR; and a second power optimizing unit, configured to, if a sum obtained by adding the preset threshold to the fourth SINR is not greater than the third SINR, update the value of the second SINR to be the third SINR and keep the first SINR unchanged, and then the selecting unit selects a target value between the value of the first SINR and the value of the second SINR as a third SINR; wherein, the communication apparatus performs an iterative calculation if an absolute value of a difference between the fourth SINR and the third SINR is not smaller than the preset threshold, and stops the iterative calculation if the absolute value of the difference is smaller than the preset threshold.

10. The communication apparatus according to claim 8, wherein the initial power processing unit obtains the initial power allocation ratio of the edge user according to equality between a weighted rate of the edge user and a weighted rate of a center user;
the first power adjusting unit calculates the first power allocation ratio of the edge user, according to the first SINR and based on the equality between the weighted rate of the edge user and the weighted rate of the center user; and
the second power adjusting unit calculates the second power allocation ratio of the edge user, according to the third SINR and based on the equality between the weighted rate of the edge user and the weighted rate of the center user.

11. The communication apparatus according to claim 10, wherein the initial power processing unit calculates the initial power allocation ratio of the edge user according to $w_0 f_0((1-\theta_l^e),\theta_l^e)=w_l f_l(1-\theta_l^e)$, wherein $w_0$ is a weight of an edge user of an $l^{th}$ base station, $w_l$ is a weight of a center user of the $l^{th}$ base station, $f_0((1-\theta_l^e),\theta_l^e)$ is a rate of the edge user of the $l^{th}$ base station, $$f_0((1-\theta_l^e),\theta_l^e) = \log\left(1 + \frac{p_l^c \theta_l^e R^e}{1 + p_l^c(1-\theta_l^e)R^c}\right),$$

$f_1(1-\theta_l^e)$ is a rate of the center user of the $l^{th}$ base station, $f_l(1-\theta_l^e)=\log(1+p_l^c(1-\theta_l^e)R^c)$, and $\theta_l^e$ is a power allocation ratio of the edge user of the $l^{th}$ base station, $1-\theta_l^e$ is a power allocation ratio of the center user of the $l^{th}$ base station, $p_l^c$ is normalized power from the $l^{th}$ base station to its center user, $R^e$ is an orthogonal space-time block coding OSTBC bit rate of the edge user, and $R^c$ is an OSTBC bit rate of the center user.

12. The communication apparatus according to claim 10, wherein:
the first power adjusting unit calculates the first power allocation ratio according to $w_0 f_0(\Gamma)=w_l f_l(1-\theta_l^e)$, wherein $f_0(\Gamma)=\log(1+\Gamma)$, a value of $\Gamma$ is the first SINR, and $f_0((1-\theta_l^e),\theta_l^e)=f_0(\Gamma)$; and
the second power adjusting unit calculates the second power allocation ratio according to $w_0 f_0(\Gamma)=w_l f_l(1-\theta_l^e)$, wherein $f_0(\Gamma)=\log(1+\Gamma)$, the value of $\Gamma$ is the third SINR, and $f_0((1-\theta_l^e),\theta_l^e)=f_0(\Gamma)$.

13. A communication apparatus according to claim 8, further comprising:
a terminal
configured to judge whether a mobile terminal is a cell edge user or a cell center user;
configured to, if the mobile terminal is the cell edge user, extract a wanted signal from received signals, process the rest of the signals as noise, and send an SINR to a base station; and
configured to, if the mobile terminal is the cell center user, demodulate a signal sent by a current base station to an edge user from received signals, subtract the demodulated signal of the edge user from the received signals, and extract a wanted signal from the rest of the signals.

* * * * *